United States Patent
Vernault et al.

(10) Patent No.: US 11,878,390 B2
(45) Date of Patent: Jan. 23, 2024

(54) DEVICE AND METHOD FOR COLD EXPANSION OF THROUGH BORE

(71) Applicant: SAFRAN HELICOPTER ENGINES, Bordes (FR)

(72) Inventors: Cyril Roger Vernault, Moissy-Cramayel (FR); Quentin Robert Marcel Bonnardel, Moissy-Cramayel (FR); Fabrice Crabos, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/755,078

(22) PCT Filed: Oct. 20, 2020

(86) PCT No.: PCT/FR2020/051891
§ 371 (c)(1),
(2) Date: Apr. 20, 2022

(87) PCT Pub. No.: WO2021/079056
PCT Pub. Date: Apr. 29, 2021

(65) Prior Publication Data
US 2022/0288744 A1    Sep. 15, 2022

(30) Foreign Application Priority Data
Oct. 25, 2019 (FR) ....................................... 1911979

(51) Int. Cl.
*B24B 39/02* (2006.01)
*B64C 27/04* (2006.01)

(52) U.S. Cl.
CPC .............. *B24B 39/02* (2013.01); *B64C 27/04* (2013.01)

(58) Field of Classification Search
CPC .......... B24B 39/02; B24B 41/02; B64C 27/04
See application file for complete search history.

(56) References Cited

U.S. PATENT DOCUMENTS 1,369,821 A * 3/1921 Layman ................. B23D 37/04
29/DIG. 95
2,726,704 A    12/1955 Fischer
(Continued)

OTHER PUBLICATIONS

International Search Report received for PCT Patent Application No. PCT/FR2020/051891, dated Feb. 23, 2021, 5 pages (2 pages of English Translation and 3 pages of Original Document).

*Primary Examiner* — Rick K Chang
(74) *Attorney, Agent, or Firm* — WOMBLE BOND DICKINSON (US) LLP

(57) ABSTRACT

The invention relates to a cold expansion device (36) for work hardening a through bore (34) in a turbine engine part (32), comprising at least one chuck (38) supporting a burnisher (40) and a means (41) for pushing the chuck (38) in an axial direction, and is characterised in that it comprises at least: —a tubular guide (42) configured to guide the burnisher (40) to the bore (34), —a first magnetic attachment means (51) arranged at a free end (44) of the chuck (38), —the burnisher (40), comprising a work surface (46) and an end (48) comprising second magnetic attachment means (49) complementary to the first magnetic attachment means (51), and in that the axial pushing means (41) is configured to push the burnisher through the bore (34) until it emerges from stud bore.

10 Claims, 2 Drawing Sheets

(56) References Cited

U.S. PATENT DOCUMENTS 6,622,570 B1     9/2003   Prevey, III
9,954,214 B2 *   4/2018   Cain ................. H01M 10/0404
10,136,689 B1 *   11/2018   Pandolfino ............. A44C 3/004

* cited by examiner

DEVICE AND METHOD FOR COLD EXPANSION OF THROUGH BORE

TECHNICAL FIELD OF THE INVENTION

The invention relates to a device for the cold expansion of a through bore, and more particularly to a burnisher-type device for the cold expansion of a bore formed in an injection wheel of a helicopter engine.

TECHNICAL BACKGROUND

The helicopter engines are generally made in the form of turbine engines called turboshaft engines which comprise from upstream to downstream, following the flux of gas flow, at least one high pressure compressor, an annular combustion chamber, and at least one high pressure turbine. The high-pressure compressor and the high pressure turbine are rotatably connected to each other by a shaft.

For reasons of compactness, such turboshaft engines generally employ, upstream of the combustion chamber, a high-pressure compressor which is an axial-centrifugal compressor and which as such is supplied with axially oriented gases, either directly or by an axial-low-pressure compressor, and which compresses them radially in the direction of a diffuser in charge of rectifying the compressed air flux axially in order to supply a combustion chamber radially by its external periphery. The air supplying the combustion chamber is then mixed with fuel and ignited in order to supply the high pressure turbine and possibly a low pressure turbine downstream of the high pressure turbine.

Because of this configuration, the combustion chamber needs to be supplied with fuel at a different point from the outer peripheral air inlet and for this purpose it can be supplied radially from its inner periphery.

For this reason, the combustion chamber generally comprises an inner annular portion which is fed internally by an injection wheel, integral with the shaft which connects the compressor to the turbine. This shaft is hollow, in order to allow the supply of fuel to the injection wheel with which it communicates. The injection wheel comprises a plurality of radially oriented bores that distribute the fuel inside the combustion chamber.

Such an injection wheel is typically made of a nickel-based alloy.

During the use of the turboshaft engine, the bores are highly stressed by the important thermomechanical stresses to which the injection wheel is subjected. These stresses cause the injection wheel to fatigue and can eventually lead to cracking and then failure of the injection wheel.

A known solution to delay the cracking of the injection wheel consists in applying a treatment to the bores of the wheel by subjecting them to a cold expansion operation aimed at hardening the material of the wheel around its bores and also producing residual compressive stresses around the bores, which thus reduce the effect of the thermomechanical stresses and thus delay the propagation of the fatigue cracks to which the bores are subjected.

In order to perform such a cold expansion, a steel burnisher is conventionally passed through each bore in order to plastically deform the injection wheel around each bore in order to work harden the material and thus increase its fatigue resistance. A similar operation, applied to a tube, is described in the document U.S. Pat. No. 2,726,704-A1, and is described by rolling a roller in the document U.S. Pat. No. 6,622,570-B1.

The burnisher is mounted on the end of a chuck and then inserted into each bore so as to run the full length of the bore.

Several configurations are currently known. In most cases, the burnisher is pulled directly through each bore or through a bushing that is previously received in each bore, to avoid degradation of the material of the bore during the passage of the burnisher. This configuration makes this operation particularly difficult because it requires a bushing to be inserted into each bore prior to the cold expansion operation and then removed without damaging the bore. This method is also limited in use in the case of parts made of a high-strength material whose bores to be expanded are small in cross-section and significant in length; the mechanical properties of the material making up the chuck being insufficient to pull the burnisher through the bore without breaking.

In another known configuration, the burnisher is positioned at the end of a chuck and pushed through each bore. However, positioning the burnisher at the end of the chuck requires perfect coaxiality of the chuck and the bore if any tool breakage is to be avoided. In addition, the drilling requires efficient lubrication, which is generally achieved with lubricants that require prior drying and that also comprise carcinogenic substances such as antimony.

SUMMARY OF THE INVENTION

The invention remedies this disadvantage by proposing a cold expansion device comprising an improved burnisher capable of sqpontaneously centering itself in the bore to be subjected to a cold expansion operation.

To this end, the invention proposes, for work hardening a through bore of a first determined length formed in a turbine engine part, in particular a helicopter engine injection wheel, a cold expansion device comprising at least one chuck supporting a burnisher and a means for axially pushing said chuck, characterized in that it comprises at least:
- a tubular guide, configured to surround the chuck and the burnisher, and configured to guide the burnisher to the bore along a collision stroke,
- a first magnetic attachment means arranged at a free end of the chuck,
- the burnisher, of a second determined length, comprising a free end used as a work surface and an opposite end comprising a second magnetic attachment means, complementary to the first magnetic attachment means,
- and in that the axial pushing means is movable by a stroke at least greater than a sum of the collision stroke, the first length of the bore, and the second length of the burnisher.

According to other features of the cold expansion device:
- the work surface extends along an entire axial length of the burnisher between the free end of the burnisher and its end comprising the second magnetic attachment means,
- the work surface has a semi-elliptical, frustoconical, or curvilinear axial section,
- the burnisher comprises a steel web of hardness and strength adapted to a material of the workpiece for enlarging and work hardening the bore,
- the web of the burnisher is covered with a coating selected as a function of the materials constituting the workpiece and the burnisher to limit the static and dynamic friction between said burnisher and said workpiece,
- the means for axially pushing said chuck is a press,
- the burnisher comprises a free end characterized by a maximum diameter that is configured to be less than or equal to the diameter of the bore before expansion, and an opposite end comprising the second attachment means and a minimum diameter configured to be greater than or equal to the diameter of the bore after expansion, the cold expansion device is adapted to a turbine engine part made of nickel alloy and the web of the burnisher is a high strength steel web of the E80DCV40 or Z100CD17 type, the cold expansion device is adapted to a turbine engine part made of nickel alloy and the coating of the burnisher is:

a coating based on solid lubricants selected from MoS2, WS2, graphite, graphite fluoride, talc, and mixtures thereof, deposited by a spraying process and/or by a physical vapor deposition process and/or by a chemical vapor deposition, in a thickness of 0.5 to 5 µm, and/or a hardness-increasing coating deposited by an ion implantation process of Boron or Nitrogen and/or a physical vapor deposition process of TiN, and/or CrN nitrides in a thickness of 0.5 to 5 µm, and/or a mixed coating of high hardness and reduced friction coefficient of amorphous carbon or tungsten carbide/WC/C carbon type deposited by a physical vapor deposition process with a thickness of 0.5 to 4 µm.

The invention also relates to a cold expansion method for work hardening at least one through bore formed in a turbine engine part, such as a helicopter engine injection wheel, using a device of the type described above, characterized in that it comprises:

a first step during which the chuck is extended from the guide, a second step during which a burnisher of a size adapted to the bore to be work-hardened is fixed to the end of the chuck, a third step during which the chuck and the burnisher are retracted into the guide, a fourth step during which the burnisher is aligned with the bore, a fifth step during which the press is actuated to push the burnisher by means of the chuck through the through bore by work hardening said bore until it comes out on the side opposite to its introduction, a sixth step in which the chuck stroke is stopped and the burnisher is removed from the chuck, a seventh step in which the chuck is retracted through the bore.

an eighth step during which the burnisher is recovered from the side of the through face of the expanded bore so that it can be reused.

BRIEF DESCRIPTION OF THE FIGURES

Further features and advantages of the invention will become apparent from the detailed description that follows, for the understanding of which reference is made to the attached drawings in which.

DETAILED DESCRIPTION OF THE INVENTION

Figure 1:
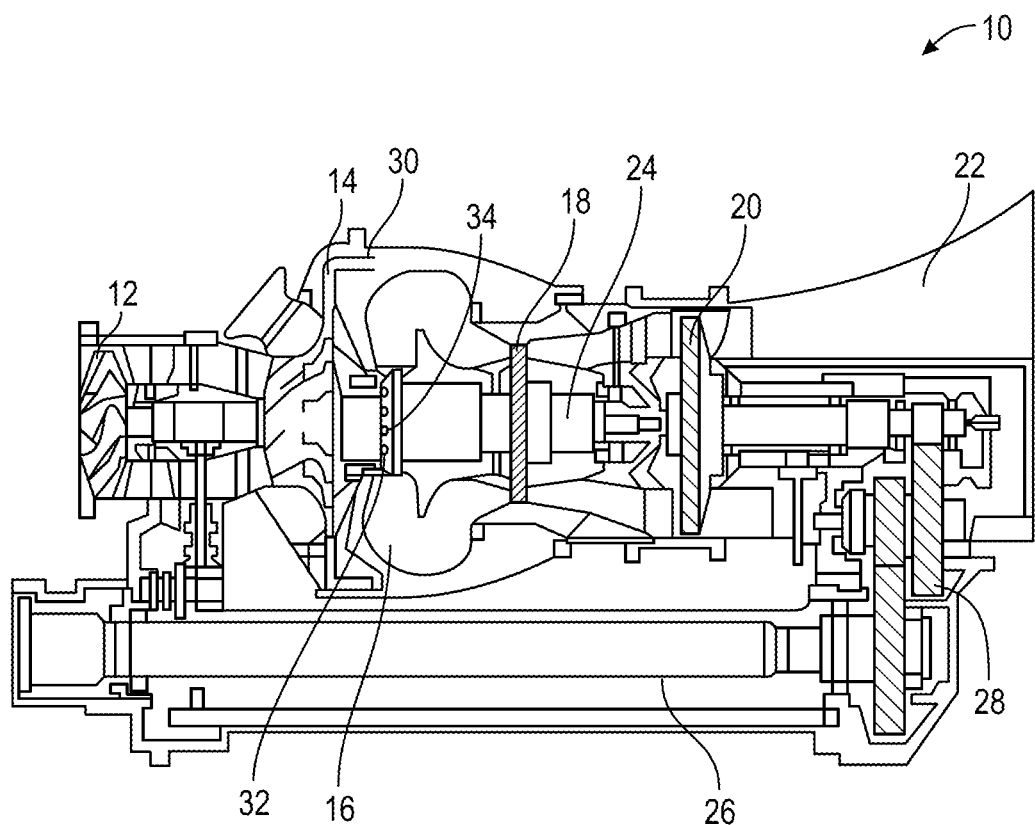
FIG. 1 is a schematic view of a turboshaft engine intended to power a helicopter.

Shown in FIG. 1 is a turboshaft engine 10 for powering a helicopter.

In a known manner, the turboshaft engine 10 is a turbine engine which comprises, from upstream to downstream according to the direction of gas flow, and as a non-limiting example, a low pressure compressor 12, a high pressure compressor 14, at least one combustion chamber 16, a high pressure turbine 18, a low pressure free turbine 20, and an exhaust nozzle 22.

The high pressure compressor 14 and the high pressure turbine 18 are connected by a shaft 24 and together form the gas generating module of the turboshaft engine. The low-pressure turbine 20 is free and independent of the high-pressure compressor 12 and drives an output shaft 26 via a reduction gear 28.

The low-pressure compressor 12 is an axial compressor that sends axially compressed air to the high-pressure compressor 14, which is an axial-centrifugal compressor, i.e., it receives a substantially axial air flux and compresses it so as to produce a substantially radial compressed air flux. This compressed air flux is then straightened through a diffuser 30 so as to enter axially into the outer periphery of the combustion chamber 16, which is substantially annular.

The air supplied to the combustion chamber 16 is mixed with fuel from fuel injectors and ignited to supply the high energy gas to the high pressure turbine 18 and the free low pressure turbine 20.

Because of this configuration, the combustion chamber 16 requires fuel to be supplied at a point other than the outer peripheral air inlet because the diffuser 30 does not allow for injectors at this location. For this purpose, it can be supplied radially from its inner periphery.

To this end, the combustion chamber generally has an inner annular portion which is internally fed by a rotating injection wheel 32, which is integral with the shaft 24.

The shaft 24 is hollow and feeds the injection wheel 32 internally, which delivers the fuel by centrifugation through the bores 34 arranged on its periphery. This configuration is particularly advantageous because it allows an excellent mixing of the fuel which is sprayed inside the combustion chamber 16.

Such an injection wheel 32 is generally made of a nickel-based alloy.

During the use of the turboshaft engine 10, the bores 34 are strongly stressed by the important thermomechanical constraints to which the injection wheel 32 is subjected.

Indeed, the injection wheel 32 is subjected to centrifugal forces and is placed in an extremely hot and poorly ventilated area of the turboshaft engine 10. The thermomechanical stresses stress the injection wheel 32 in fatigue and can eventually lead to cracking of the injection road 32 from its bores 34 and then to a rupture of the injection wheel 32.

A known solution for delaying the propagation of fatigue cracks in the injection wheel 32 consists of applying a treatment to the bores 34 thereof by subjecting them to a cold expansion operation aimed at hardening the material of the wheel 32 around its bores 34. The purpose of such an operation is to work harden the material of the wheel 32 locally around the bores 34 and to produce around its bores 34 gradients of hardness and residual compressive stresses aimed at attenuating the thermomechanical stresses to which the bores 34 are subjected.

To achieve such cold expansion, a steel burnisher is conventionally passed through each bore, directly or indirectly, in order to plastically deform the injection wheel around each bore in order to work harden the material and thus increase its fatigue resistance.

A burnisher consists of a generally cylindrical or frusto-conical steel element of a diameter slightly larger than that of the bore 34 to be work-hardened, which is moved along the bore in order to enlarge it by locally crushing around the periphery of the bore 34, the material of this bore 34 in order to work-harden it.

The burnisher is mounted on the end of a chuck and then inserted into each bore so as to travel the entire length of the bore 34.

In a known configuration, the burnisher is attached to the end of a chuck and pushed through each bore, with or without a bushing. However, the fixed mounting of the burnisher at the end of the chuck requires perfect coaxiality of the chuck and the bore 34, which requires long and tedious adjustments if any breakage of the tool is to be avoided. Furthermore, in the case of use without a bushing, the bore 34 requires efficient lubrication, which is generally carried out using lubricants that require prior drying, which lengthens the work hardening operation.

In addition, such lubricants may contain carcinogenic substances such as the antimony.

The invention remedies this drawback by providing a novel design of a cold expansion device 36 for work hardening a bore 34 of an injection wheel 32.

Figures 2, 3, 4:
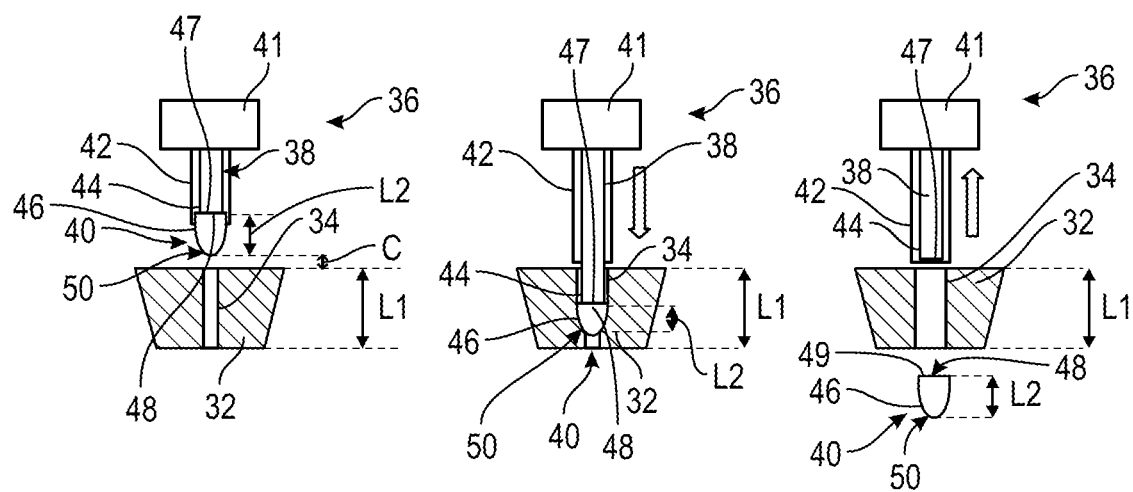
FIG. 2 is a schematic view of a first step of a cold expansion process according to the invention.
FIG. 3 is a schematic view of a second step of a cold expansion process according to the invention.
FIG. 4 is a schematic view of a third step of a cold expansion process according to the invention.

As illustrated in FIGS. 2 through 4, the cold expansion device 36 according to the invention is intended to allow expansion of a bore 34 of a given first length L1 formed in the injection wheel 32 of the previously described turboshaft engine 10.

It will be understood that this arrangement is not limiting and that the device 36 could be used to perform cold expansion of any other bore or hole of the turbine engine, without limitation of the invention.

The device 36 comprises, in a known manner, at least one chuck 38 supporting a burnisher 40 and a means for axially pushing 41 of the chuck 38.

However, unlike the cold expansion devices known in the prior art, the device 36 comprises various elements allowing the burnisher 40 to be guided, then pushed through the bore 34, and finally recovered on the opposite side of the bore 34 through which it was introduced.

To this end, the device 36 comprises at least one tubular guide 42 which is configured to surround the chuck 38 and the burnisher 40, and which is configured to guide the burnisher 40 to the bore 34 according to a collision stroke C.

Indeed, the burnisher 40 is movable at the end of the chuck 38 from a rest position, which has been represented in FIG. 2, in which it is arranged at a distance from the bore 34 to be work hardened corresponding to the collision stroke C, in particular so as to allow its displacement in order to align it opposite the bore 34. The burnisher 40 must therefore cover the collision stroke C before attacking the bore 34.

The device 36 also advantageously comprises a first magnetic attachment means 47 arranged at a free end 44 of the chuck 38. This first magnetic attachment means 47 may in particular consist of a permanent magnet or an electromagnet. This first magnetic attachment means 47 is intended to allow the fixing of the burnisher 40, the centering of the burnisher 40 with respect to the bore 34, and is, as will be seen in the remainder of this description, the removal of the burnisher 40 at the end of the cold expansion operation.

The device 36 also comprises the burnisher 40 which is of a second specified length L2. The burnisher 40 comprises a free end 50 comprising a work surface 46 and an opposite end 48 comprising a second magnetic attachment means 49, complementary to the first magnetic attachment means 47. As a result, the burnisher 40 is adapted to be attached to the end of the chuck 38 through the cooperation of its end 48 having the second magnetic attachment means 49 cooperating with the first magnetic attachment means 47, and is capable of being easily removed therefrom in the same manner.

In accordance with the invention, the axial pushing means 41 is movable through a stroke at least greater than a sum of the collision stroke C, the first length of the hole L1, and the second length L2 of the burnisher 40.

This stroke allows, as illustrated in FIGS. 1 to 3, the burnisher 40 to approach the bore 34, then to push the burnisher 40 through the bore 34 along its entire length, and finally to pull it out on the side opposite to its introduction.

In the preferred embodiment of the invention, the axial pushing means 41 is a press, but it will be understood that this configuration is not limited to the invention and that it could be an actuator of another type.

As this is a burnisher 40 which is intended to ensure cold expansion of the bore 34 by direct contact, particular care must be taken with the materials of this burnisher 40. To this end, the burnisher 40 comprises a steel web of a hardness and strength adapted to a material of the workpiece whose bore 34 it is to expand and work harden, i.e. here the injection wheel 32.

In particular, in the case of an injection wheel 32 made, as is often the case, of a nickel alloy, the web of the burnisher 40 is a very high strength steel web of the E80DCV40 or Z100CD17 type.

The choice of material for the web of the burnisher 40 is critical to avoid damage to the burnisher 40 that could introduce debris between the burnisher 40 and the surface of the bore 34, which would damage the surface of the bore 34, with potential cracking from this damage.

In addition, the web of the burnisher 40 is covered with a coating that is also chosen according to the constituent materials of the part and the burnisher 40, i.e. the injection wheel 32, to limit static and dynamic friction between the burnisher 40 and the injection wheel 32.

Still being a nickel alloy injection wheel 32, the burnisher coating can be of different types.

It can be a coating based on solid lubricants selected from MoS2, WS2, graphite, graphite fluoride, talc, and mixtures thereof, which are deposited by a spraying process and/or by a physical vapor deposition process and/or by a chemical vapor deposition process, all in a thickness of 0.5 to 5 μm.

It can also be a hardness-increasing coating deposited by an ion implantation process of Boron or Nitrogen and/or by a physical vapor deposition process of TiN, and/or CrN nitrides, all in a thickness of 0.5 to 5 μm.

Finally, it can be a mixed coating of high hardness and reduced friction coefficient of amorphous carbon or tungsten carbide/WC/C carbon type deposited by a physical vapour deposition process, with a thickness of 0.5 to 4 μm.

Moreover, the geometry of the burnisher 40 is also a determining factor.

As the burnisher 40 is intended to pass through the entire bore 34, and to emerge from it on the opposite side where it was introduced, it is necessary that its work surface 46 extends along the entire axial length L2 of the burnisher between one end of the burnisher 40 and its end 48 comprising the second magnetic attachment means.

Figure 5:
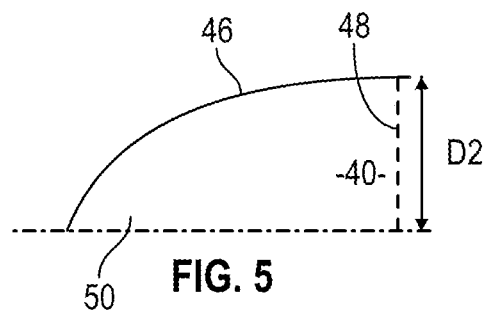
FIG. 5 is a schematic axial cross-sectional view of a first embodiment of a burnisher according to the invention.
Figure 6:
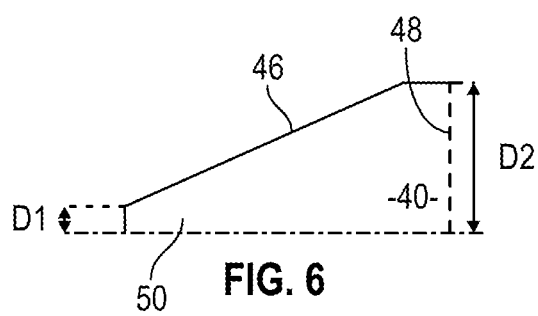
FIG. 6 is a schematic axial cross-sectional view of a second embodiment of a burnisher according to the invention.
Figure 7:
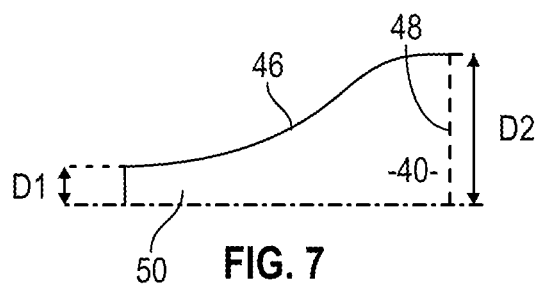
FIG. 7 is a schematic axial cross-sectional view of a third embodiment of a burnisher according to the invention.
Figure 8:
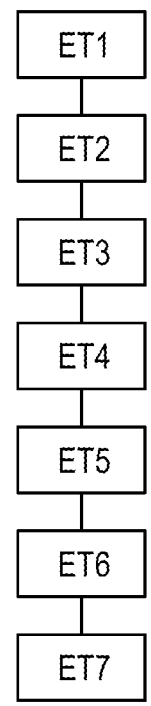
FIG. 8 is a block diagram illustrating the steps of a cold expansion process according to the invention.

As illustrated in FIGS. 5 through 7, the work surface 46 may have different axial cross-sections.

For example, as illustrated in FIG. 5, the work surface 46 may have a semi-elliptical axial cross-section. As illustrated in FIG. 6, the work surface 46 may have a frustoconical axial cross-section. Finally, as illustrated in FIG. 7, the work surface 46 may have a mixed, i.e., curvilinear axial cross-section.

It will be understood that the free end 50 of the burnisher has a maximum diameter that is configured to be less than or equal to the diameter of the bore 34 before expansion. In FIG. 5, this diameter is zero due to the semi-elliptical cross-section of the burnisher 40, but in the embodiments of FIGS. 6 and 7, this diameter D1 is non-zero.

Similarly, the end 48 comprising the second means of fixing the burnisher 40 has a minimum diameter D2 that is configured to be greater than or equal to the diameter of the bore 34 after expansion.

In this configuration, the cold expansion operation of the bores 34 of an injection wheel 32 can be conducted using the previously described device 36.

According to a first step ET1 (not shown), the bare chuck 38 is extended out of the guide 42, so as to make its free end 44 accessible.

Then, during a second step ET2 (not shown), a burnisher 40 of a size adapted to the bore 34 to be work hardened is fixed to the end of the chuck 38. Then, during a third step ET3, the chuck 38 and the burnisher 40 are retracted into the guide 42, according to the configuration of FIG. 2.

The burnisher 40 is then aligned with the bore 34 in a fourth step ET4. A fifth step ET5 follows, during which the press 41 is activated to push the burnisher 40 with the help of the chuck 38 through the through bore 34 by work hardening said bore, as shown in FIG. 3, until it comes out on the opposite side to its introduction.

Then, in a sixth step ET6, the stroke of the chuck 38 is stopped and the burnisher 40 is removed from the chuck 38 as shown in FIG. 4.

The chuck 38 is then free to be retracted through the bore 34 during a final step ET7 (not shown), without risk of damaging the bore 34.

The invention thus allows to substantially reduce the working time devoted to work hardening the bores 34 of a turbine engine part, and to limit the risks of damage to the bores thereof or to the tooling used.

The invention claimed is:

1. A cold expansion device for work hardening a through bore of a first determined length formed in a turbine engine part, in particular a helicopter engine injection wheel, comprising at least one chuck supporting a burnisher and a pushing means for axially pushing said chuck, wherein the device comprises at least:
   a tubular guide, surrounding the chuck and the burnisher, and configured to guide the burnisher to the bore according to a collision stroke,
   a first magnetic attachment means arranged at a free end of the chuck,
   the burnisher, of a second determined length, comprising a free end comprising a work surface and an opposite end comprising a second magnetic attachment means, complementary to the first magnetic attachment means, wherein the pushing means is movable by a stroke at least greater than a sum of the collision stroke, the first length of the bore, and the second length of the burnisher.

2. The cold expansion device according to claim 1, wherein the work surface extends along an entire axial length of the burnisher between the free end and the opposite end comprising the second magnetic attachment means.

3. The cold expansion device according to claim 2, wherein the work surface has a semi-elliptical, frustoconical, or curvilinear axial section.

4. The cold expansion device according to claim 2, wherein the burnisher comprises a steel web of a hardness and strength adapted to a material of the turbine engine part for enlarging and work hardening the bore.

5. The cold expansion device according to claim 4, wherein the web of the burnisher is covered with a coating selected as a function of the materials of the turbine engine part and the burnisher to limit static and dynamic friction between said burnisher and said workpiece.

6. The cold expansion device according to claim 1, wherein the pushing means for axially pushing said chuck is a press.

7. The cold expansion device according to claim 2, wherein the free end of the burnisher has a maximum diameter that is configured to be less than or equal to a diameter of the bore before expansion, the end comprising the second attachment means of the burnisher having a minimum diameter configured to be greater than or equal to the diameter of the bore after expansion.

8. The cold expansion device according to claim 4 wherein the turbine engine part is made of nickel alloy and wherein the web of the burnisher is a very high strength steel web of a E80DCV40 or Z100CD17 type.

9. The cold expansion device according to claim 5 wherein the turbine engine part is made of nickel alloy and wherein the selected coating covering the burnisher is:
   a coating based on solid lubricants selected from MoS2, WS2, graphite, graphite fluoride, talc, and mixtures thereof, deposited by a spraying process and/or by a physical vapour deposition process and/or by a chemical vapour deposition, in a thickness of 0.5 to 5 μm, and/or
   a hardness-increasing coating deposited by an ion implantation process of Boron or Nitrogen and/or a physical vapor deposition process of TiN, and/or CrN nitrides in a thickness of 0.5 to 5 μm, and/or
   a mixed coating of high hardness and reduced friction coefficient of amorphous carbon or tungsten carbide/WC/C carbon type deposited by a physical vapor deposition process with a thickness of 0.5 to 4μm.

10. A cold expansion method for work hardening at least one through bore formed in a turbine engine part, such as a helicopter engine injection wheel, using a device according to claim 1, wherein it comprises:
   a first step during which the chuck is extended from the guide,
   a second step during which the burnisher of a size adapted to the bore to be work-hardened is fixed to the end of the chuck,
   a third step during which the chuck and the burnisher are retracted into the guide,
   a fourth step in which the burnisher is aligned with the bore,
   a fifth step during which the pushing means is actuated to push the burnisher by means of the chuck through the through bore from a first side, by work hardening said bore until the burnisher comes out on a second side opposite to the first side, a sixth step during which the stroke of the chuck is stopped and the burnisher is removed from the chuck, a seventh step in which the chuck is retracted through the bore.

\* \* \* \* \*